Jan. 4, 1955
S. C. BRITTON ET AL
2,698,510
METHOD AND FUEL FOR OPERATING PULSE-JET ENGINES
AND PROTECTIVELY COATING VALVES OF SUCH ENGINES
Filed Dec. 28, 1948
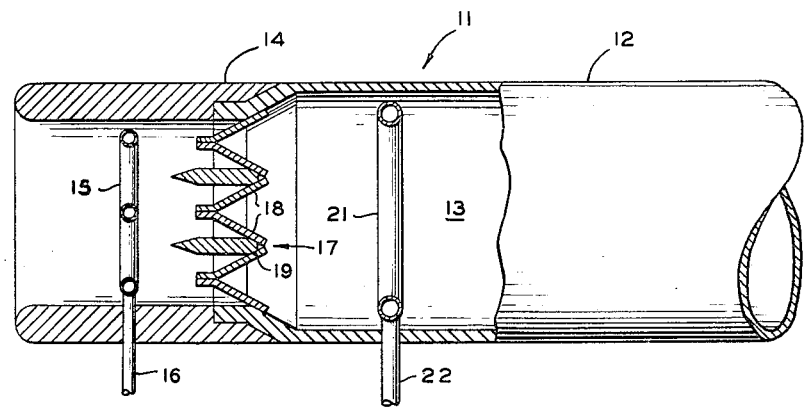
INVENTORS
S. C. BRITTON
R. M. SCHIRMER
BY
*Hudson and Young*
ATTORNEYS United States Patent Office 2,698,510
Patented Jan. 4, 1955

2,698,510

METHOD AND FUEL FOR OPERATING PULSE-JET ENGINES AND PROTECTIVELY COATING VALVES OF SUCH ENGINES

Sylvester C. Britton and Robert M. Schirmer, Bartlesville, Okla., assignors to Phillips Petroleum Company, a corporation of Delaware Application December 28, 1948, Serial No. 67,764

25 Claims. (Cl. 60—35.4)

This invention relates to jet engine fuel. In one of its more specific aspects it relates to improved pulse jet engine fuel. In another of its more specific aspects it relates to a method for operating pulse jet engines.

This is a continuation-in-part of our United States patent application Serial No. 352, filed January 2, 1948, and Application 794,427, filed December 29, 1947.

A pulse jet engine is an intermittent, compressorless, aerodynamic power plant. The engine is composed of a shaped tube fitted with one-way flow check valves at the forward end. Unlike typical reciprocating internal combustion engines the problem of knocking is not one of the difficulties of operation. In Diesel engines, which are classified as compression ignition engines, the difficulty of attaining constant pressure heat addition presents a problem of high importance. The problem presented in the operation of the pulse jet engine is, however, diametrically opposite. It is desirable in the operation of a pulse jet engine to attain the most rapid possible pressure rise. It is thus desirable to provide a fuel for a pulse jet engine which will have the shortest possible burning time, the greatest combustion heat output, and one which will produce the greatest forward thrust.

The pulse jet engine comprises few or none of the mechanical features of stationary power plants. The engine is, as above stated, composed of a shaped tube fitted with one-way check valves at the forward end. Some conventional valves comprise thin sheets of spring metal which are attached so as to close on metal seats. The tube is so constructed that air flows successively through an entrance venturi, past the flow check valves into a cylindrical combustion zone of fixed size. The engine is started by forcing the air through a mixing zone where fuel and air are mixed. The fuel-air mixture is then introduced into a primary combustion zone. Initial ignition for the fuel is provided by a spark producing attachment, such as a conventional spark plug mounted in the wall of the combustion chamber. The resulting explosion closes the flow check valves, thus preventing continuous combustion of fuel which is continuously injected into admixture with air in the mixing zone ahead of the primary combustion zone. The explosion forces the combustion gases outwardly through a transition cone and a tail pipe, exhausting to the atmosphere. Inertia effects of the gases in the tail pipe cause the portion of combustion gas remaining in the combustion zone to expand below the pressure of the surrounding atmosphere.

Pressure of the air which exceeds the reduced pressure within the combustion zone causes the flow check valves to open so as to allow the passage of another charge of air into the mixing zone and another charge of fuel-air mixture into the primary combustion zone. The fuel is thought to be ignited by heat from the hot combustion gases remaining in the combustion zone. The cycle comprising fuel-air injection, combustion and exhaust repeats itself with a frequency of from 30 to 400 cycles per second depending upon the size of unit, valve design, fuel, and other factors. Once started, the operation proceeds without necessity of ram air or operation of a spark producing attachment.

An object of the invention is to provide an improved fuel for use in pulse jet engines. Another object is to provide a pulse jet fuel which burns with the greatest possible efficient heat output. Another object is to provide a pulse jet fuel which has a high rate of flame propagation. Another object is to provide an improved means of insulating parts of pulse jet engines which are exposed to high temperature. Another object is to provide improved means for reducing failure of moving parts of pulse jet engines which failure results from fatigue. Another object is to provide an improved method for operating pulse jet engines. Another object is to provide a pulse jet engine fuel which will give a maximum of thrust per unit of fuel consumed with the least possible deterioration of the pulse jet engine. Other and further objects and advantages will be apparent upon study of the accompanying discussion and the claims.

Better understanding of the invention will be obtained upon reference to the drawing which is a schematic elevation of the forward portion of a pulse jet engine, partially in section.

Referring particularly to the device shown in the drawing, pulse jet engine 11 comprises shell 12 which encloses combustion chamber 13. Inlet cowling 14 is attached to the forward end of shell 12 and encloses metal organic material inlet header member 15. Conduit 16 extends between a metal-organic material storage tank, not shown, and header member 15. Valves 17, which comprise valve blades 18 and valve seats 19, are positioned at the downstream end of inlet cowling 14. Fuel inlet header 21 is provided in the upstream end portion of combustion chamber 13 and is connected to a fuel storage chamber, not shown, by fuel conduit 22.

In the operation of the device shown in the drawing, fuel containing metal-organic material is introduced into the forward portion of combustion chamber 13 through fuel inlet header 21 and is ignited in that chamber. The fuel expands during the rapid decomposition thereof and forces valve blades 18 against valve seats 19 to close the valves. The resulting combustion gas is rapidly exhausted through the downstream end of the pulse jet engine, lowering the pressure within combustion zone 13 so as to allow valves 17 to open and permit air to flow through inlet cowling 14, valves 17 and into combustion zone 13. A metal-organic material contained in the fuel is injected onto the surface of valve blades 18 during the operation of the engine. Alternatively, in the device shown, the metal-organic material, dissolved in any suitable solvent material, may be introduced through metal-organic material inlet header member 15 into the air stream and thereby injected onto the valve blades. The metal-organic material, being so injected onto the valve blades, forms a removable cushion which absorbs a considerable amount of the shock normally absorbed by the valve blade upon contact with the valve seat.

From a consideration of the basic principles of operation of a pulse jet engine it is quite evident that the more rapid the rate of combustion the easier the engine will start. That result probably occurs because of the fact that an explosion of considerable violence must take place in order to create a low pressure area in the combustion chamber and thus start the series of pulsations necessary for engine operation.

In addition to the fact that it is desirable that the rate of combustion of the fuel should be explosive, we have discovered that best operating results are obtained when the fuel also has a high heat release. A high heat release will result in greater expansion of the combustion gas which results from the burning of the fuel. A greater intensity of shock wave is thus obtained by increasing the volume of combustion gas which is exhausted from the combustion chamber and thus in turn increases the thrust effect of the escaping gas.

The high temperatures within a pulse jet engine resulting from a higher heat release of the fuel tend to reduce the operating life of flow check valves in the forward part of the engine. Another factor which enters into the reduction of valve life in the pulse jet engine is the fact that rapid contact between the seating surfaces of the valves results in impact fatigue of the valves. Broadly speaking this invention pertains to a process of improving pulse jet fuel by dissolving a small portion of relatively high boiling metal-organic material in a pulse jet fuel and operating a pulse jet engine on such a fuel.

We have discovered that hydrocarbons, which are not generally used as fuels for reciprocating combustion engines, may be used with excellent effect as a base fuel in the operation of pulse jet engines. Normal paraffins boiling in the range of between 90° F. and 500° F. furnish those characteristics of high heat release found to be so desirable in pulse jet fuels. It is preferred to use those normal paraffins as a pulse jet fuel which boil in the range of between 150° F. and 350° F. Normal paraffins boiling between 350° F. and 500° F. may be satisfactorily utilized as pulse jet fuels by properly atomizing the fuel before its injection into the primary combustion zone for burning. A fuel consisting essentially of a hydrocarbon stock and containing normal paraffins boiling in the range of from 150° F. to 500° F. is advantageous in that its use results in longer valve life in the pulse jet engine than does the use of a normal paraffin fuel boiling below 150° F. A fuel comprising normal paraffins boiling between 20° F. and 150° F. has better starting characteristics, however, than does a fuel comprising normal paraffins boiling within the range of between 150° F. and 500° F. Many of the advantages of the lower boiling fuel can be secured by mixing a portion of the normal paraffins boiling between 20° F. and 150° F. with normal paraffins boiling between 150° F. and 500° F. so as to comprise a hydrocarbon stock of a pulse jet engine fuel. Such a fuel has markedly better start-up characteristics than does a fuel comprising a hydrocarbon stock which excludes the lower boiling normal paraffins. We have found that while the starting characteristics of the mixed fuel are improved by the addition of the lower boiling normal paraffins, the valve life of pulse jet engines operated on the fuel is substantially unaffected by the addition.

We have further found that very efficient pulse jet engine operation may be obtained by operating such an engine on a fuel which consists essentially of a hydrocarbon stock which contains at least 50 per cent by volume of normal paraffins boiling in the range of between 150° F. and 500° F. Addition of between 5 per cent and 20 per cent by volume normal paraffins boiling in the range of between 20° F. and 150° F. substantially shortens the time required to start up a pulse jet engine utilizing such a fuel. Utilization of a hydrocarbon stock containing between 50 per cent and 85 per cent by volume of normal paraffins boiling in the range of 150° F. and 350° F. is preferred to that of operation with the broader range fuel, while the most preferred fuel is a hydrocarbon stock which contains between 75 per cent and 85 per cent by volume normal paraffins boiling in the range of between 150° F. and 350° F. Improved starting characteristics are also provided for our preferred fuels by the addition of between 5 and 20 per cent by volume of normal paraffins boiling in the range of between 20° F. and 150° F.

On occasion, shortage of fuel storage space may somewhat limit the length of time over which continuous operation of a pulse jet engine may be maintained. Under such conditions, the desired length of time for operation of a pulse jet engine together with the shortage of fuel capacity space may outweigh a desire for the highest efficiency of operation, in the determination of a fuel mixture for a pulse jet engine. Aromatics or substituted aromatics boiling in the range of between 175° F. and 350° F. have a high heat release per unit volume. Inasmuch as it may be desirable to get the greatest economical amount of heat release from a limited fuel load it may be desirable to mix selected aromatics boiling within the above boiling range with normal paraffins boiling within the range of between 150° F. and 350° F. together with a smaller fraction of normal paraffins boiling within the range of between 20° F. and 150° F. A fuel which consists essentially of a hydrocarbon stock and contains at least 50 per cent by volume of normal paraffins boiling in the range of 150° F. and 350° F. or 150° F. and 500° F. and between 5 per cent and 20 per cent by volume of normal paraffins boiling in the range of 20° F. and 150° F. together with 10 per cent to 45 per cent by volume aromatics boiling within the range of 175° F. to 350° F. provides a high ratio of heat release for a relatively small volume of fuel and one which has excellent start-up characteristics.

Specific normal paraffins which may be utilized for at least 50 per cent by volume of a hydrocarbon stock of a pulse jet engine fuel may include normal hexane, normal heptane, normal octane and normal decane. Normal paraffins which may be utilized to make up the 5 to 20 per cent normal paraffins of a hydrocarbon stock of a pulse jet engine fuel may be butane and/or pentane. Aromatics such as benzene and toluene and/or substituted aromatics, such as cumene, may make up the 10 to 45 per cent aromatic portion of the fuel volume.

It is preferred that the composite pulse jet fuel contain substantially no isoparaffinic material. In view of the fact that it is practically impossible to eliminate all isoparaffins in commercial distillation systems, it will usually be found necessary, however, to tolerate up to about 10 per cent by volume of isoparaffins in the finished fuel. Other non-deleterious materials may also go to make up a portion of the finished fuel. Some materials which may be utilized with our preferred fuel are nitro-paraffins, nitro aromatics, ketones, ethers and alcohols. Such materials may make up as much as 30 per cent by volume of the finished material. It is however preferred to limit those materials to an amount not exceeding 10 per cent by volume of the finished fuel.

The practical use of pulse jet engines is considerably reduced by the short length of life of the flow check valves of the engine. There seem to be two primary causes for such a reduction in valve life. As pointed out above, those causes seem to be the exposure of valves to high temperatures, and fatigue resulting from rapid contact between valve and valve seat. We have discovered a fuel which substantially increases the normal valve life of such an engine. It is not known exactly how our improved pulse jet engine fuel extends the valve life of a pulse jet engine. It is probable that the benefit is due at least in part to a cushioning action which an additive hereinafter described has upon the pulse jet valves. Such cushioning action would tend to reduce impact fatigue failure of the valves. It is further believed that the fuel containing the additive hereafter described also performs the function of insulating the valve members against the high temperatures within the pulse jet engine.

Our improved fuel comprises as a base fuel the hydrocarbons above described together with a minor proportion of a metal-organic or halogenated metal-organic material which is formed of the metals in the electromotive series (shown below) from lithium to mercury, inclusive, dissolved within the base fuel.

*Electromotive series of the metals*

| Lithium | Manganese | Antimony |
| Rubidium | Zinc | Bismuth |
| Potassium | Chromium | Arsenic |
| Sodium | Iron | Copper |
| Strontium | Cadmium | Mercury |
| Barium | Cobalt | Silver |
| Calcium | Nickel | Platinum |
| Magnesium | Tin | Gold |
| Aluminum | Lead | |

The metal-organic and halogenated metal-organic materials which may be utilized for the purpose of this invention must meet the following specifications: Be capable of forming at least a temporary coating on the seating surface of valves of a pulse jet engine, have a Reid vapor pressure of not more than 20 pounds per square inch absolute, have a minimum solubility of .01 per cent by volume in normal heptane at 0° F. and have at least no anti-knock characteristics. The metal-organic or halogenated metal-organic material may be dissolved in the base fuel in an amount ranging from 0.01 per cent to about 5 per cent by volume of the finished fuel. It is preferred to limit the amount of the metal-organic material in the fuel to a range of between about 0.1 per cent and about 1 per cent by volume.

The word "dissolved" as used in this application is meant to include not only dissolving so as to form true solutions, but is also meant to include the formation of colloidal solutions. A similar scope of meaning is to be applied to the term "solubility" as used herein. The term "metal-organic" as utilized in this application is meant to include halogenated and other metal compounds in which a metal of the electromotive series from lithium to mercury is linked to an organic radical or to salts of monocarboxylic acids having between one and twenty carbon atoms per molecule.

Metal-organic materials which meet the specifications set forth above fall generally into three classes. The first class includes metal-organic compounds which are capable only of forming a temporary coating on the seating surfaces of valves of a pulse jet engine in a manner similar to the coating formations of organic materials disclosed in our United States patent application, Serial No. 352, filed January 2, 1948. The second class of materials includes metal-organic compounds which form a temporary coating on the seating surfaces of valves of a pulse jet engine and upon being exposed to the heat of combustion of that engine, decompose so as to leave a metallic or metal-oxide reisdue coating on the seating surfaces of the valves. The metal-organic materials which fall within the two classes disclosed above have no noticeable effect upon the combustion characteristics of the fuel. The third class of metal-organic materials, which are utilized as a portion of the fuel of this invention, coat the seating surfaces of the valves os do the metal-organic materials in the first and second classes, but the materials falling within the third class have the effect of ignition accelerators in the combustion of the fuel.

Specific metal-organic materials which fall within the first class above include aluminum stearate, magnesium naphthenate and calcium stearate. Materials falling within the second class above include tetra-normal-octyltin, lead tetraacetate, and nickel dimethylglyoxime. Materials falling within the third group disclosed above include diphenylhydroxyborine, dichloromethylarsine and triethyl antimony.

The metal-organic materials form a coating over the pulse jet engine parts and provide a sufficiently thick cushion on the valve seats and blades that it breaks the shock of their contact together. Another function of the coating appears to be the insulation of engine parts. The exact reaction of the added organic material within the engine is not known. Substantially no deleterious residue results from the metal-organic material in the pulse jet engine during operation. Neither is there any excessive accumulation of the metal-organic material within the engine. It is possible that any quantity of metal-organic material which is in excess of that necessary to coat or cushion the valves is carried into the primary combustion zone by the fuel-air mixture flow. That effect may be intensified by the high frequency vibrations of the valves. Another possibility is that there may be a certain amount of vibrations of the metal-organic material from the heated surface of the jet engine.

Pulse jet engines are operated with the greatest efficiency when the fuels discussed hereinbefore are supplied to a given engine at fuel-air ratios ranging between .01 and .08. It is within the scope of this invention to operate a pulse jet engine with our preferred fuel mixed with oxygen. If oxygen or an oxygen-supplying compound, such as a peroxide, is used rather than another oxygen-supplying gas, such as air, the fuel-air ratios would necessarily have to be adjusted accordingly so as to maintain a fuel-oxygen ratio equivalent to the fuel-air ratio disclosed herein. It is preferred to operate a pulse jet engine by supplying the fuel to such an engine at a fuel-air ratio ranging between .03 and .07. Much difficulty is encountered in attempting to measure the exact amount of air actually supplied to a pulse jet engine because of the fact that up to about 30 per cent by volume of air may enter the combustion zone through the engine tail pipe or exhaust zone. A given pulse jet engine may be operated in a range of between 30 and 400 cycles per second, depending upon the size of the engine. Progressively larger engines operate at progressively lower cycle rates. By the term "cycle" we mean to include the steps of introducing the fuel-air charge into a primary combustion zone and igniting the fuel charge so as to produce an explosion which in turn produces a shock wave. The shock wave closes the flow check valves ahead of the flame front, thus preventing the flame from following the fuel-air mixture into the mixing zone, and carries a portion of the combustion gas out of the combustion zone through an exhaust zone from which it is exhausted to the surrounding atmosphere. Inertia of the combustion gas passing from the combustion zone causes a decrease in pressure in the gas remaining within the combustion zone to a pressure below that of the surrounding atmosphere. Pressure of the surrounding atmosphere which is greater than the reduced pressure in the combustion zone causes the flow check valves to open, thus permitting another charge of fuel-air mixture to flow into the primary combustion zone and thus start another cycle. The fuel-air mixture is thought to be ignited by heat from the combustion gas remaining in the combustion zone though there are other theories as to just what causes the fuel charge to ignite. Another cycle of operation of the engine is thus begun.

As has been pointed out above, it is highly desirable to get the greatest possible heat release from a given pulse jet engine without substantially shortening the valve life of the engine. Operation of pulse jet engines at the above mentioned conditions will result in a "temperature rise" in the engine which may range from about 800° F. to about 4500° F. By "temperature rise" we mean that rise of temperature taken between the inlet end of the engine and ranging to the highest temperature of the gas passing from the engine tail pipe or exhaust zone.

The metal-organic materials disclosed above may be utilized separate and distinct from the fuel upon which the pulse jet engine operates. Any solvent material which has a non-deleterious effect upon the combustion of the fuel within the pulse jet engine may be utilized to dissolve non-fluid metal-organic materials disclosed above, which solution may be injected onto the seating surfaces of valves of the pulse jet engine by an injection separate from the injection of fuel into the pulse jet engine. Metal-organic materials which are sufficiently fluid may be injected onto the seating surfaces of the valves without being dissolved in either the engine fuel or another solvent.

As will be evident to those skilled in the art, various modifications of the invention can be made or followed in the light of the foregoing disclosure and discussion without departing from the spirit or scope of the disclosure.

We claim:

1. A jet engine fuel consisting essentially of a hydrocarbon stock having not more than 10 per cent by volume isoparaffins and containing at least 50 per cent by volume normal paraffins boiling in the range of between 150° F. and 500° F., between 5 per cent and 20 per cent by volume of normal paraffins boiling in the range of between 20° F. and 150° F.; and between 0.1 per cent and 5 per cent by volume of a metal salt of a monocarboxylic acid having between 1 and 20 carbon atoms per molecule, said metal being one of those found in the electromotive series from lithium to mercury, inclusive, said metal salt being capable of forming at least a temporary coating on the seating surface of valves of a pulse jet engine, having a Reid vapor pressure of up to 20 p. s. i. a., having a minimum solubility of .01 per cent by volume in normal heptane at 0° F., and having no anti-knock characteristics.

2. A jet engine fuel consisting essentially of a hydrocarbon stock having not more than 10 per cent by volume isoparaffins and containing at least 50 per cent by volume normal paraffins boiling in the range of between 90° F. and 500° F.; between 10 per cent and 45 per cent by volume aromatics boiling in the range of between 175° F. and 350° F.; and between 0.1 per cent and 5 per cent by volume of a metal salt of a monocarboxylic acid having between 1 and 20 carbon atoms per molecule, said metal being one of those found in the electromotive series from lithium to mercury, inclusive, said metal salt being capable of forming at least a temporary coating on the seating surface of valves of a pulse jet engine, having a Reid vapor pressure of up to 20 p. s. i. a., having a minimum solubility of .01 per cent by volume in normal heptane at 0° F., and having no anti-knock characteristics.

3. A jet engine fuel consisting essentially of a hydrocarbon stock having not more than 10 per cent by volume isoparaffins and containing between 75 per cent and 85 per cent by volume normal paraffins boiling in the range of between 150° F. and 350° F., and between 5 per cent and 20 per cent by volume of normal paraffins boiling in the range of between 20° F. and 150° F.; and between 0.1 and 5 per cent by volume of a metal salt of a monocarboxylic acid having between 1 and 20 carbon atoms per molecule, said metal being one of those found in the electromotive series from lithium to mercury, inclusive, said metal salt being capable of forming at least a temporary coating on the seating surface of valves of a pulse jet engine, having a Reid vapor pressure of up to 20 p. s. i. a., having a minimum solubility of .01 per cent by volume in normal heptane at 0° F., and having no anti-knock characteristics.

4. An improved method for operating a pulse jet engine which comprises the steps of mixing a fuel, consisting essentially of a hydrocarbon stock having not more than 10 per cent by volume isoparaffins and containing at least 50 per cent by volume normal paraffins boiling in the range of between 150° F. and 500° F., and between .01 per cent and 5 per cent by volume of a metal salt of a monocarboxylic acid having between 1 and 20 carbon atoms per molecule, said metal being one of those found in the electromotive series from lithium to mercury, inclusive, said metal salt being capable of forming at least a temporary coating on the seating surface of valves of a pulse jet engine, having a Reid vapor pressure of up to 20 p. s. i. a., having a minimum solubility of .01 per cent by volume in normal heptane at 0° F. and having no anti-knock characteristics, with air in a fuel-air ratio between .01 and .08; injecting a portion of said mixture into the forward portion of a primary combustion zone of fixed size; igniting said fuel mixture, whereby a shock wave is produced in the resulting explosion; exhausting the resulting combustion gas to an exhaust zone; and repeating the cycle of fuel-air injection, combustion, and exhaust at the rate of between 30 and 400 cycles per second so as to produce a temperature rise in said engine ranging between 800° F. and 4500° F.

5. The method of claim 4, wherein said hydrocarbon stock contains at least 50 per cent by volume normal paraffins boiling in the range of between 150° F. and 350° F. and between 5 per cent and 20 per cent by volume normal paraffins boiling in the range of between 20° F. and 150° F.; and injecting said fuel into said combustion zone at a fuel-air ratio between .03 and .07.

6. The method of claim 4, wherein said hydrocarbon stock contains between 5 per cent and 20 per cent by volume normal paraffins boiling in the range of between 20° and 150° F.

7. In a method of operating a pulse jet engine having a combustion zone of fixed size which is constantly open at its rear end and which is so adapted at the forward portion as to allow the passage of fuel and air thereinto, wherein said fuel is intermittently ignited; the improvement which comprises supplying as the fuel for said engine, a fuel consisting essentially of a hydrocarbon stock having not more than 10 per cent by volume isoparaffins and containing at least 50 per cent by volume of normal paraffins boiling in the range of between 90° F. and 500° F. and between 0.1 per cent and 5 per cent by volume of a metal salt of a monocarboxylic acid having between 1 and 20 carbon atoms per molecule, said metal being one of those found in the electromotive series from lithium to mercury, inclusive, said metal salt being capable of forming at least a temporary coating on the seating surface of valves of a pulse jet engine, having a Reid vapor pressure of up to 20 p. s. i. a., having a minimum solubility of .01 per cent by volume in normal heptane at 0° F., and having no anti-knock characteristics, in a fuel-air ratio between .01 and .08.

8. In a method of operating a pulse jet engine having a combustion zone of fixed size which is constantly open at its rear end and which is so adapted at the forward portion as to allow the passage of fuel and air thereinto, wherein said fuel is intermittently ignited at a rate of between 30 and 400 cycles per second; the improvement which comprises supplying as the fuel for said engine a fuel consisting essentially of a hydrocarbon stock having not more than 10 per cent by volume isoparaffin and containing at least 50 per cent by volume normal paraffins boiling in the range of 90° F. and 500° F. with between 10 per cent and 45 per cent by volume aromatics boiling between 175° F. and 350° F., and between 0.1 per cent and 5 per cent by volume of a metal salt of a monocarboxylic acid having between 1 and 20 carbon atoms per molecule, said metal being one of those found in the electromotive series from lithium to mercury, inclusive, said metal salt being capable of forming at least a temporary coating on the seating surface of valves of a pulse jet engine, having a Reid vapor pressure of up to 20 p. s. i. a., having a minimum solubility of .01 per cent by volume in normal heptane at 0° F., and having no anti-knock characteristics, in a fuel-air ratio between .01 and .08.

9. A jet engine fuel consisting of a hydrocarbon stock having not more than 10 per cent by volume isoparaffins and containing at least 50 per cent by volume normal paraffins boiling in the range of between 90° F. and 500° F.; and between 0.1 per cent and 5 per cent by volume of a metal salt of a monocarboxylic acid having between one and twenty carbon atoms per molecule, said metal being one of those found in the electromotive series from lithium to mercury, inclusive, said metal salt being capable of forming at least a temporary coating on the seating surface of valves of a pulse jet engine, having a Reid vapor pressure up to 20 p. s. i. a., having a minimum solubility of .01 per cent by volume in normal heptane at 0° F., and having no anti-knock characteristics.

10. The jet engine fuel of claim 9, wherein said metal salt is aluminum stearate.

11. The jet engine fuel of claim 9, wherein said metal salt is calcium stearate.

12. The jet engine fuel of claim 9, wherein said metal salt is lead tetraacetate.

13. The jet engine fuel of claim 9, wherein said metal salt is magnesium naphthenate.

14. The jet engine fuel of claim 2, wherein said metal salt is aluminum stearate.

15. The jet engine fuel of claim 2, wherein said metal salt is calcium stearate.

16. The jet engine fuel of claim 2, wherein said metal salt is lead tetraacetate.

17. The jet engine fuel of claim 2, wherein said metal salt is magnesium naphthenate.

18. The method of claim 7, wherein said metal salt is aluminum stearate.

19. The method of claim 7, wherein said metal salt is calcium stearate.

20. The method of claim 7, wherein said metal salt is lead tetraacetate.

21. The method of claim 7, wherein said metal salt is magnesium naphthenate.

22. The method of claim 8, wherein said metal salt is aluminum stearate.

23. The method of claim 8, wherein said metal salt is calcium stearate.

24. The method of claim 8, wherein said metal salt is lead tetraacetate.

25. The method of claim 8, wherein said metal salt is magnesium napthenate.

References Cited in the file of this patent

UNITED STATES PATENTS

| 2,142,601 | Bleecker | Jan 3, 1939 |
| 2,151,432 | Lyons et al. | Mar. 21, 1939 |
| 2,560,542 | Bartleson | July 17, 1951 |

FOREIGN PATENTS

| 386,908 | Great Britain | Jan. 26, 1933 |

OTHER REFERENCES

Journal of the American Rocket Society, June 1945, No. 62, page 5.

The Petroleum Handbook, 3rd edition, Shell Petroleum Co., Ltd., London, pages 339, 391.